UNITED STATES PATENT OFFICE.

PEDER FARUP, OF TRONDHJEM, NORWAY, ASSIGNOR, BY MESNE ASSIGNMENTS, TO TITAN CO. A/S., OF CHRISTIANIA, NORWAY.

PROCESS OF PRODUCING REFINED TITANIUM-OXYGEN COMPOUNDS.

1,325,561.     Specification of Letters Patent.     Patented Dec. 23, 1919.

No Drawing.     Application filed November 21, 1916. Serial No. 132,619.

*To all whom it may concern:*

Be it known that I, PEDER FARUP, a subject of Norway, and a resident of Trondhjem, Kingdom of Norway, have invented certain new and useful Improvements in Processes of Producing Refined Titanium-Oxygen Compounds, of which the following is a specification.

This invention relates to a process for the recovery of titanium, in the form of titanium oxygen compounds (oxids or hydrates), from titaniferous material, such as ilmenite; and the object of the invention is the production of these compounds whereby a large percentage of the impurities present in the original material is initially removed and the ultimate product comparatively free therefrom, all in an economical and practical manner.

In the processes heretofore employed in which an acid has been used to decompose the ilmenite, it has been the practice to carry the impurities, principally iron, or a large part thereof, along with the titanium beyond the first decomposition step, and subsequently to treat the decomposed mass containing the salts of the base forming elements including titanium in a manner to eliminate the impurities therefrom and eventually to produce the titanium oxygen compounds or hydrates sought. In one of these processes the decomposed mass is leached and a solution formed from which the titanium is subsequently precipitated in the form of hydrates, the iron remaining in solution. In another the decomposed mass is heated to such a degree that the titanium salts are decomposed while the iron salts remain unaffected; the resultant mass then being leached, the titanium remains as a residue in the form of an oxid, and the iron is removed by washing.

Considerable difficulty has been experienced in obtaining a comparatively pure product by either of these methods, and where such is desired, it has been the practice to submit the product obtained in accordance therewith to refining processes.

In my process on the other hand the impurities present in the titaniferous materials are initially removed, in whole or in large part, by treating the material with a substance of an acid character which will dissolve the impurities without dissolving the titanium, the dissolved impurities being removed by leaching. The titanium now remaining as a residue is converted into the form of a salt, and the titanium recovered therefrom as an oxygen compound.

In the following example of this process I have chosen ilmenite as the titaniferous material from which titanium is to be recovered, hydrochloric acid as the decomposition agent for initially dissolving the iron in the ilmenite, and sulfuric acid as the agent by which the soluble salts of titanium are formed, but in presenting this example and choosing these materials, it is to be understood that the invention is not intended to be limited thereto nor thereby, nor to the production of the precise product obtained.

Taking up now the specific example chosen for illustrative purposes, the ilmenite first having been pulverized, is placed in a suitable container, and digested with hydrochloric acid, the apparatus chosen being preferably such that escape of the hydrochloric acid is prevented during this step. I have found that twenty per cent. hydrochloric acid in the proportion of three parts by weight of the acid to one part by weight of the ilmenite gives satisfactory results when the mixture is maintained at temperatures between 70° and 80° C. for about twelve hours with frequent stirring. After the desired decomposition has taken place, the resultant mass is filtered, and the impurities comprising for the most part chlorids of iron, which remain in the residue after filtering, are removed by washing. The washed residue is then subjected to the action of sulfuric acid to form titanium sulfates, the sulfates dissolved in water and the titanium precipitated from the solution in the form of hydrates by any well known and convenient manner.

When ilmenite containing thirty-one per cent. iron was treated as above described and the residue washed with three waters, it was found to contain practically all of the titanium originally present in the ilmenite and only a small percentage of the iron. A large part of the iron of the residue, converted into sulfates along with the titanium, remained in the solution on precipitation of the hydrates, so that the latter were comparatively free from iron.

The hydrochloric acid can be readily recovered from the solution first formed in any suitable manner, as by adding to the solution sufficient sulfuric acid to decompose the chlorid, or slightly in excess thereof, and heating, whereupon hydrochloric acid is given off and can be collected, the resultant iron sulfates remaining as a residue.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. The process of producing titanium oxygen compounds from titaniferous materials containing iron, which comprises treating the material with a substance of an acid character to dissolve the iron but not the titanium, treating the residue with an acid material to convert the titanium into a salt and recovering the titanium in the form of an oxygen compound from the salt.

2. The process of producing titanium oxygen compounds from titaniferous materials containing iron, which comprises treating the material with a substance of an acid character to dissolve the iron but not the titanium, treating the residue with an acid material to convert the titanium into a soluble salt, dissolving the said salt and recovering the titanium in the form of a hydrate by precipitation.

3. The process of producing titanium oxygen compounds from titaniferous materials containing iron, which comprises treating the material with hydrochloric acid to dissolve the iron but not the titanium, treating the residue with sulfuric acid and to convert the titanium into a sulfate, dissolving the sulfate and precipitating the titanium in the form of a hydrate.

4. The process of producing titanium oxygen compounds from ilmenite which comprises digesting the ilmenite with twenty per cent. hydrochloric acid in the ratio of one part by weight of hydrochloric acid to three parts by weight of the ilmenite, filtering the resultant mass, washing the residue, treating the washed residue with sulfuric acid, dissolving the resultant titanium sulfate in water and precipitating the titanium in the form of hydrates from the solution thus formed.

5. The process of producing refined titanium oxygen compounds from materials containing titanium and iron comprising the steps of first treating the materials in question with hydrochloric acid to dissolve iron compounds, while leaving the titanium compounds undissolved and subsequently decomposing the undissolved titanium compounds by means of another decomposing agent.

6. The process of producing refined titanium oxygen compounds from materials containing titanium and iron comprising the steps of first treating the materials in question with hydrochloric acid to dissolve iron compounds while leaving the titanium compounds undissolved, decomposing the undissolved titanium compounds by means of another decomposing agent, leaching the decomposition product, and precipitating titanium hydrate compounds from the solution obtained.

7. The process of producing refined titanium oxygen compounds from materials containing titanium and iron comprising the steps of treating the material in question with hydrochloric acid in such a quantity, of such concentration, and at such temperatures and other conditions as to bring about the dissolution of the iron compounds of said material while leaving the titanium compounds undissolved, separating the solution from the undissolved matter, and treating the residuum containing undissolved titanium compounds with another decomposing agent to dissolve the said titanium compounds.

8. The process of producing titanium oxygen compounds from materials containing iron and titanium comprising the steps of treating the material in question with hydrochloric acid so as to dissolve iron compounds and subsequently decomposing the remaining undissolved titanium compounds by means of sulfuric acid.

In testimony that I claim the foregoing as my invention, I have signed my name in presence of two subscribing witnesses.

PEDER FARUP.

Witnesses:
GUDRUM KOEN,
FERNANDA OLSEN.